(12) United States Patent
Ko et al.

(10) Patent No.: US 12,183,228 B2
(45) Date of Patent: *Dec. 31, 2024

(54) METHOD AND APPARATUS FOR INSPECTING DISPLAY DEVICE

(71) Applicant: Samsung Display Co., Ltd., Yongin-si (KR)

(72) Inventors: Jun Young Ko, Yongin-si (KR); Tae Joon Kim, Yongin-si (KR); Eun Sol Seo, Yongin-si (KR); Yu Jin Sin, Yongin-si (KR); Jun Seong Lee, Yongin-si (KR); Jae Woo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,725

(22) Filed: Aug. 29, 2023

(65) Prior Publication Data

US 2023/0410702 A1 Dec. 21, 2023

Related U.S. Application Data

(63) Continuation of application No. 17/831,330, filed on Jun. 2, 2022, now Pat. No. 11,769,430.

(30) Foreign Application Priority Data

Sep. 17, 2021 (KR) .......................... 10-2021-0125076

(51) Int. Cl.
*G09G 3/00* (2006.01)
*G06F 3/041* (2006.01)
(Continued)

(52) U.S. Cl.
CPC .......... *G09G 3/006* (2013.01); *G06F 3/0412* (2013.01); *G09G 3/3233* (2013.01);
(Continued)

(58) Field of Classification Search
CPC ................. G09G 3/006; G09G 3/3233; G09G 2300/0426; G09G 2300/0819;
(Continued)

(56) References Cited

U.S. PATENT DOCUMENTS 6,600,472 B1 * 7/2003 Nakai .................. G09G 3/2011
345/206
8,274,481 B2 9/2012 Nishimura et al.
9,871,082 B2 1/2018 Jeon
(Continued)

FOREIGN PATENT DOCUMENTS

JP 2006-146895 A 6/2006
JP 2007-256958 A 10/2007
KR 10-2061108 1/2020

OTHER PUBLICATIONS

Notice of Allowance dated May 19, 2023, in U.S. Appl. No. 17/831,330.

*Primary Examiner* — Hong Zhou
(74) *Attorney, Agent, or Firm* — Lewis Roca Rothgerber Christie LLP

(57) ABSTRACT

An apparatus for inspecting a display device including a touch sensor may include: a power source generator configured to generate a pixel voltage of the display device; and a variable impedance circuit electrically connected to an output terminal of the power source generator, wherein the variable impedance circuit may include: a variable resistance circuit electrically connected to the power source generator and an output terminal of the variable impedance circuit, and including resistors connected in parallel with each other; and a variable capacitor circuit electrically connected to the power source generator and a ground voltage source.

6 Claims, 16 Drawing Sheets

(51) Int. Cl.
*G09G 3/3233* (2016.01)
*G06F 3/044* (2006.01)

(52) U.S. Cl.
CPC .......... *G06F 3/0416* (2013.01); *G06F 3/0446* (2019.05); *G06F 2203/04111* (2013.01); *G09G 2300/0426* (2013.01); *G09G 2300/0819* (2013.01); *G09G 2300/0842* (2013.01); *G09G 2330/021* (2013.01); *G09G 2330/10* (2013.01)

(58) Field of Classification Search
CPC ..... G09G 2300/0842; G09G 2330/021; G09G 2330/10; G06F 3/0412; G06F 3/0416; G06F 3/0446; G06F 2203/04111
See application file for complete search history.

(56) References Cited

U.S. PATENT DOCUMENTS

| | | | |
|---|---|---|---|
| 2005/0180083 A1 | 8/2005 | Takahara et al. | |
| 2008/0036433 A1* | 2/2008 | Huang | G06F 1/26 323/266 |
| 2008/0055211 A1 | 3/2008 | Ogawa | |
| 2008/0157802 A1 | 7/2008 | Gardner et al. | |
| 2008/0246702 A1* | 10/2008 | Lee | G09G 3/3233 345/77 |
| 2013/0328952 A1* | 12/2013 | Bae | G09G 3/3655 345/212 |
| 2015/0294620 A1 | 10/2015 | Cho et al. | |
| 2017/0083133 A1 | 3/2017 | Kang | |
| 2019/0064562 A1* | 2/2019 | Nakui | G09F 9/00 |
| 2019/0285691 A1 | 9/2019 | Ryu | |
| 2021/0201719 A1 | 7/2021 | Lee | |

* cited by examiner

GL: GL1, GL2
PL: PL1, PL2

METHOD AND APPARATUS FOR INSPECTING DISPLAY DEVICE

CROSS-REFERENCE TO RELATED APPLICATION

This application is a Continuation of U.S. patent application Ser. No. 17/831,330, filed on Jun. 2, 2022, which claims priority from and the benefit of Korean Patent Application No. 10-2021-0125076, filed Sep. 17, 2021, which is hereby incorporated by reference for all purposes as if fully set forth herein.

BACKGROUND

Field

One or more embodiments relate to a method and apparatus for inspecting a display device.

Discussion

In recent years, interest in information displays has increased. Accordingly, research and development on display devices have been continuously conducted, such as in the realm of detecting defects to improve display quality.

The above information disclosed in this section is only for understanding the background of the inventive concepts, and, therefore, may contain information that does not form prior art.

SUMMARY

One or more embodiments provide a method for inspecting a display device and capable of detecting a defect related to a pixel electrode of the display device including a touch sensor One or more embodiments provide an apparatus for inspecting a display device and capable of detecting a defect related to a pixel electrode of the display device including a touch sensor.

Additional aspects will be set forth in the detailed description which follows, and, in part, will be apparent from the disclosure, or may be learned by practice of the inventive concepts.

According to an embodiment, a method for inspecting a display device (which includes a pixel electrode and a touch sensor overlapping the pixel electrode) includes: adjusting an impedance value of a variable impedance circuit of an inspection apparatus according to a model of the display device; driving a power source generator of the inspection apparatus; supplying a pixel voltage to the pixel electrode through an output terminal connected to the variable impedance circuit; driving the touch sensor; and detecting a defect related to the pixel electrode based on sensing signals output from the touch sensor.

According to an embodiment, an apparatus for inspecting a display device includes a power source generator and a variable impedance circuit. The power source generator is configured to generate a pixel voltage of the display device. The variable impedance circuit is electrically connected to an output terminal of the power source generator. The variable impedance circuit includes a variable resistance circuit and a variable capacitor circuit. The variable resistance circuit is electrically connected between the output terminal of the power source generator and an output terminal of the variable impedance circuit. The variable capacitor circuit is electrically connected between the output terminal of the power source generator and a reference voltage source.

According to an embodiment, an apparatus for inspecting a display device including a touch sensor includes: a power source generator configured to generate a pixel voltage of the display device; and a variable impedance circuit electrically connected to an output terminal of the power source generator, wherein the variable impedance circuit includes: a variable resistance circuit electrically connected to the power source generator and an output terminal of the variable impedance circuit, and including resistors connected in parallel with each other; and a variable capacitor circuit electrically connected to the power source generator and a ground voltage source.

The variable resistance circuit may further include: first switches electrically connected in parallel between the resistors and the output terminal of the variable impedance circuit, each of the first switches being electrically connected in series to any one of the resistors; and a second switch electrically connected between the output terminal of the power source generator and the output terminal of the variable impedance circuit, the second switch being electrically connected in parallel with the resistors and the first switches.

The second switch may be directly connected to the output terminal of the power source generator and the output terminal of the variable impedance circuit.

The variable capacitor circuit may include: third switches electrically connected to the output terminal of the power source generator and electrically connected in parallel to each other; and capacitors electrically connected in parallel between the third switches and the ground voltage source, each of the capacitors being electrically connected in series to any one of the third switches.

The power source generator may be configured to supply the pixel voltage to a pixel electrode of the display device via the variable impedance circuit.

The pixel voltage may be a low-potential pixel voltage.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION OF SOME EMBODIMENTS

Figure 1:
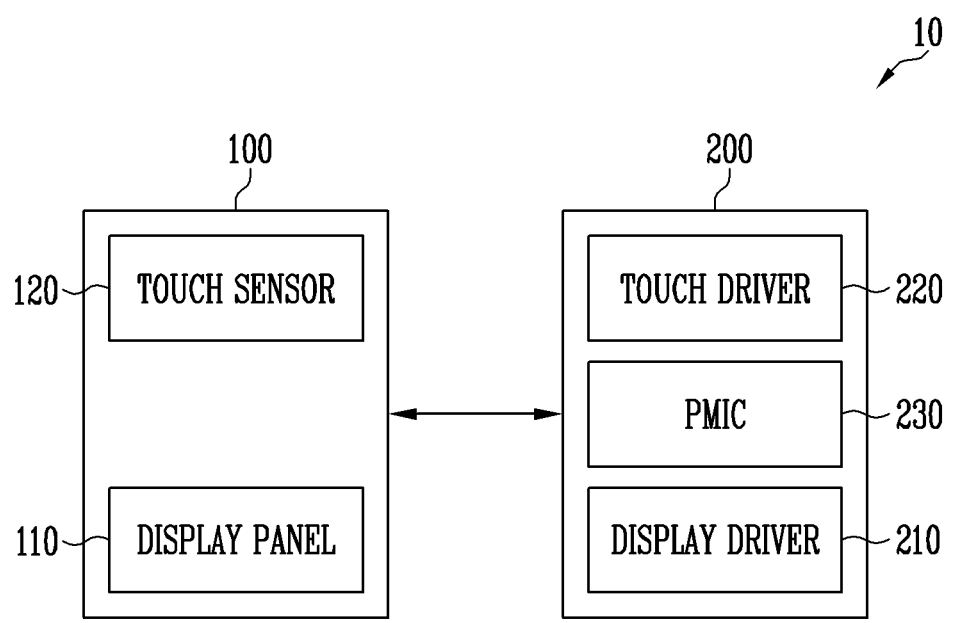
FIG. 1 is a block diagram illustrating a display device according to an embodiment.

In the following description, for the purposes of explanation, numerous specific details are set forth in order to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional views, isometric views, perspective views, plan views, and/or exploded illustrations that are schematic illustrations of idealized embodiments and/or intermediate structures. As such, variations from the shapes of the illustrations as a result of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

Figure 2:
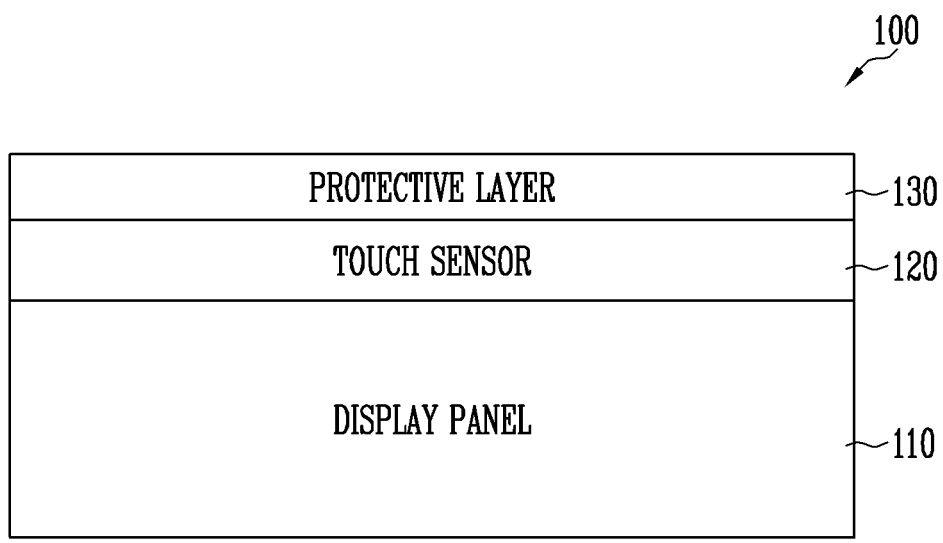
FIG. 2 is a cross-sectional view schematically illustrating a panel unit of the display device according to an embodiment.

FIG. 1 is a block diagram illustrating a display device 10 according to an embodiment. FIG. 2 is a cross-sectional view schematically illustrating a panel unit 100 of the display device 10 according to an embodiment.

Referring to FIGS. 1 and 2, the display device 10 according to an embodiment may include the panel unit (or panel) 100 and a driving circuit unit (or driving circuit) 200. The driving circuit unit 200 may be electrically connected to the panel unit 100, and may supply power source voltages and driving signals for driving the panel unit 100 to the panel unit 100. Also, the driving circuit unit 200 may receive sensing signals from the panel unit 100 and may detect a touch input generated from the panel unit 100 based on the sensing signals.

The panel unit 100 may include a display panel 110 and a touch sensor 120 (or a sensor unit of the touch sensor 120). The display panel 110 and the touch sensor 120 may overlap each other. For example, the touch sensor 120 may be provided on the display panel 110, such as provided directly on the display panel 110.

The panel unit 100 may further include a protective layer 130 positioned on (or as) the uppermost layer. For example, the protective layer 130 may be provided on the touch sensor 120.

In an embodiment, the panel unit 100 may be a panel unit of a flexible display device having flexibility such that at least a portion of the flexible display device can be folded, bent, twisted, rolled, or otherwise flexed. To increase flexibility, the panel unit 100 may be provided with a thin thickness.

In an embodiment, the display panel 110 and the touch sensor 120 may be integrally formed and/or provided. For example, the touch sensor 120 may be directly formed on the display panel 110. For instance, the touch sensor 120 may be formed in a continuous process with the display panel 110 such that an adhesive layer is not formed between the touch sensor 120 and the display panel 110. When the touch sensor 120 is integrally formed with the display panel 110, the thickness of the panel unit 100 may be reduced and flexibility may be increased.

Figure 3:
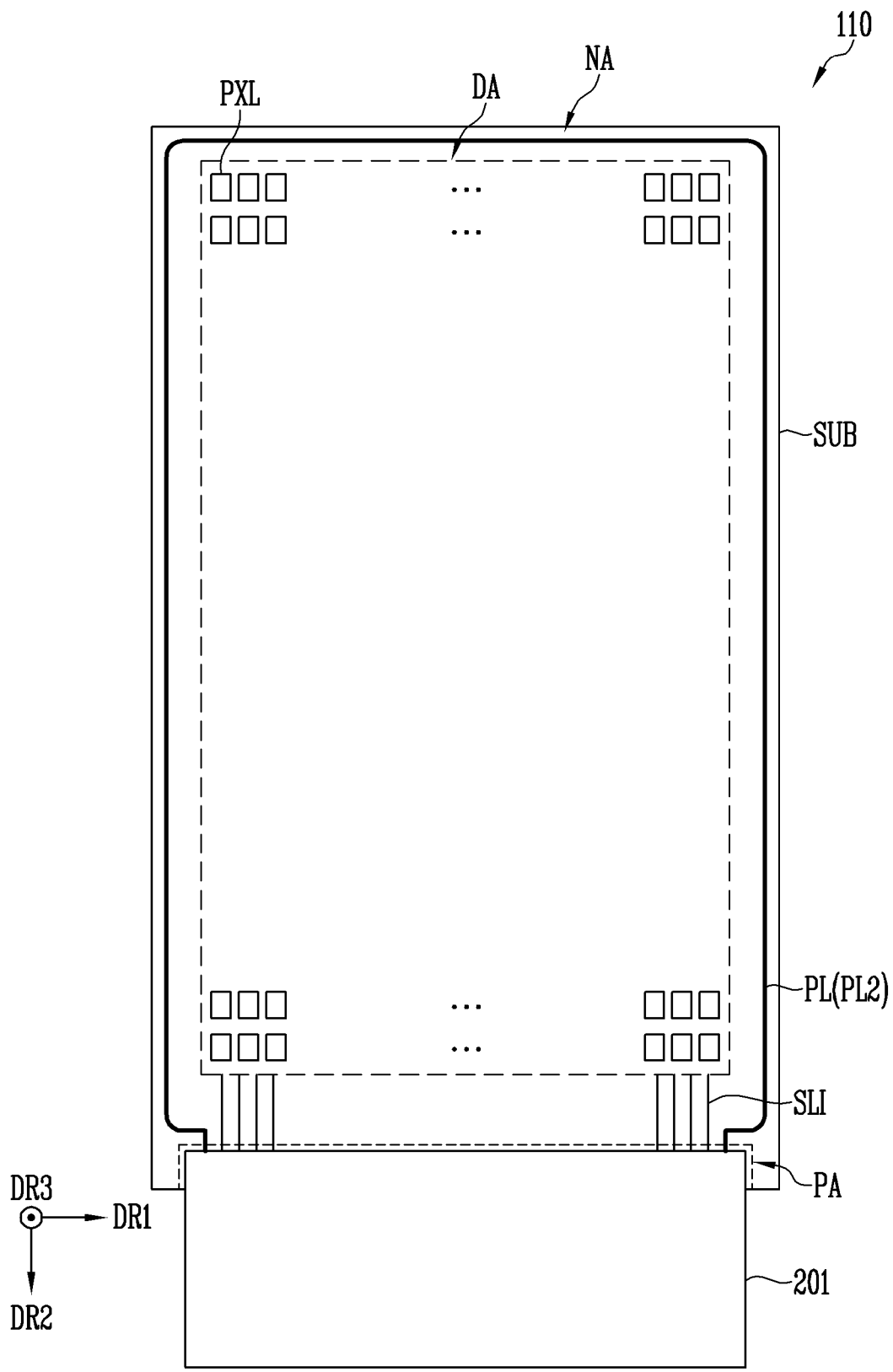
FIG. 3 is a plan view illustrating a display panel according to an embodiment.

The display panel 110 may include pixels (for example, pixels PXL of FIG. 3) disposed in a display area DA (see FIG. 3). The display panel 110 may display an image corresponding to input image data using the pixels.

Figure 5:
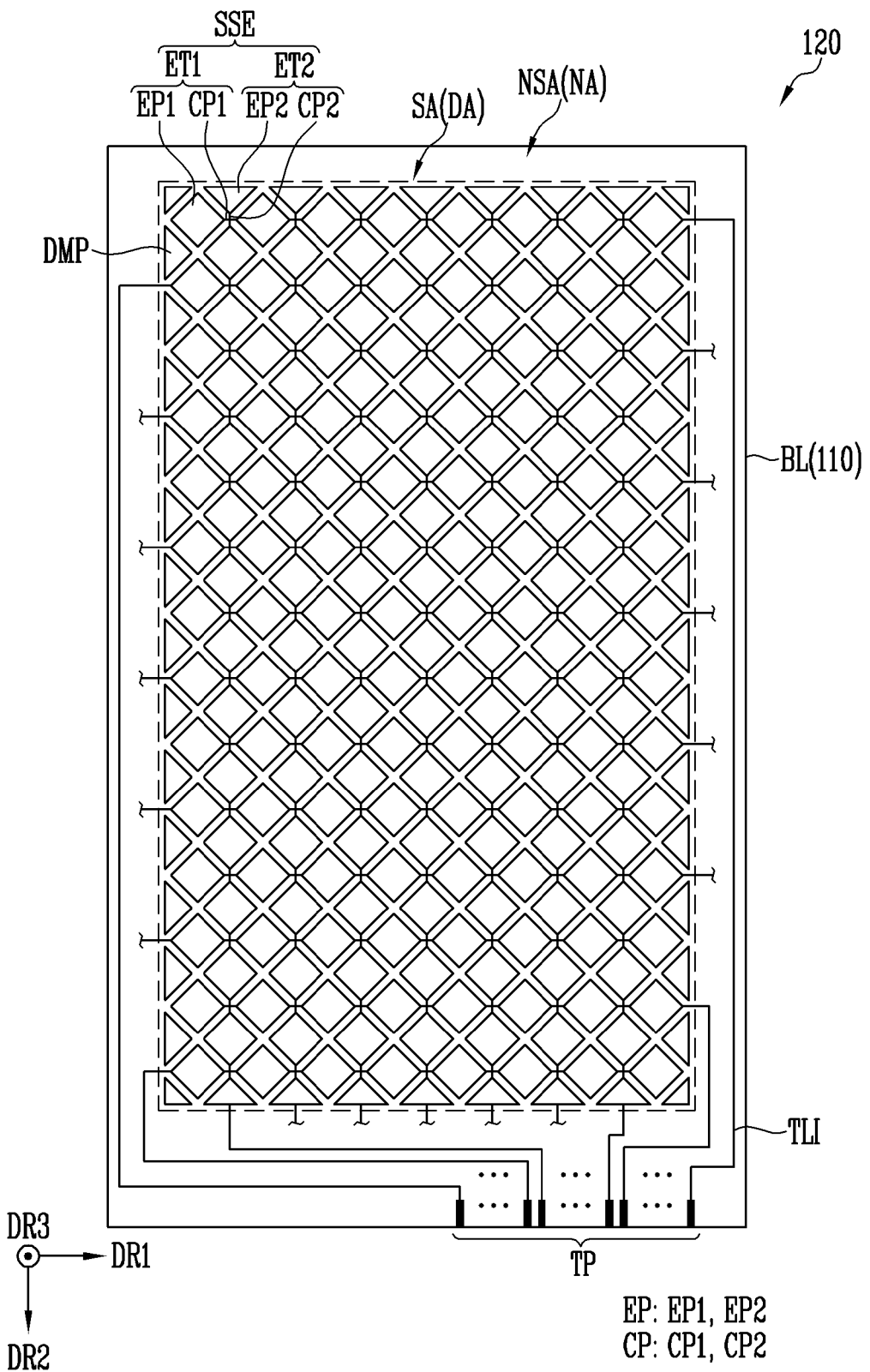
FIG. 5 is a plan view illustrating a touch sensor according to an embodiment.

The touch sensor 120 may include sensor electrodes (for example, sensor electrodes SSE of FIG. 5) disposed in a sensing area SA (see FIG. 5). The touch sensor 120 may output the sensing signals that change according to the touch input applied to the panel unit 100. In an embodiment, the touch sensor 120 may be a capacitive touch sensor (for example, a mutual capacitive touch sensor).

The driving circuit unit 200 may include a display driver 210 and a touch driver 220 (or a driving circuit unit of the touch sensor 120).

The display driver 210 may be electrically connected to the display panel 110. The display driver 210 may generate driving signals (for example, gate signals and/or data signals supplied to the pixels) for driving the display panel 110, and supply the driving signals to the display panel 110. In an embodiment, the display driver 210 may include a gate driver for generating the gate signals, a data driver for generating the data signals, and a timing controller for controlling the gate driver and the data driver.

The touch driver 220 may be electrically connected to the touch sensor 120. The touch driver 220 may generate driving signals for driving the touch sensor 120 (for example, touch driving signals supplied to driving electrodes of the touch sensor 120), and supply the driving signals to the touch sensor 120. The touch driver 220 may receive the sensing signals output from the touch sensor 120 and detect the touch input based on the sensing signals.

The driving circuit unit 200 may further include a power supply unit that generates driving voltages for driving the panel unit 100 using an input voltage. For example, the driving circuit unit 200 may further include a power management integrated circuit (PMIC) 230. The PMIC 230 may generate a first pixel voltage (for example, a high-potential pixel voltage) and a second pixel voltage (for example, a low-potential pixel voltage) to be supplied to the pixels of the display panel 110 and supply them to the panel unit 100.

FIG. 3 is a plan view illustrating a display panel 110 according to an embodiment.

Referring to FIGS. 1, 2 and 3, the display panel 110 according to an embodiment may include a substrate SUB and pixels PXL disposed on the substrate SUB. The substrate SUB and the display panel 110 including the same may be provided in various shapes. For example, the substrate SUB and the display panel 110 may be provided in the form of a plate having a rectangular shape or other shapes, and may include angled or rounded corner portions.

In FIG. 3, as an example, the display panel 110 is shown in the form of a plate having a rectangular shape. Also, in the display panel 110, a horizontal direction (for example, a row direction) may be defined as a first direction DR1, a vertical direction (for example, a column direction) may be defined as a second direction DR2, and a thickness direction (or a height direction) may be defined as a third direction DR3.

The substrate SUB may be a base member for forming the display panel 110. For example, the substrate SUB may constitute a base surface of the display panel 110.

The substrate SUB and the display panel 110 including the same may include a display area DA and a non-display area NA. The display area DA may be an area in which an image is displayed. The non-display area NA may be an area other than the display area DA.

The pixels PXL may be disposed in the display area DA. In an embodiment, each pixel PXL may be a self-light emitting type pixel including at least one light emitting element (for example, an organic light emitting diode).

Signal lines SLI and a power source line PL electrically connected to the pixels PXL may be disposed in the non-display area NA.

The signal lines SLI may include gate lines and/or data lines electrically connected to the pixels PXL, respectively, or routing lines electrically connected to the gate lines and/or data lines.

The power source line PL may include a plurality of power source lines including a second power source line PL2. For example, the power source line PL may include a first power source line (for example, a first power source line PL1 of FIG. 4) for supplying a high-potential pixel voltage to the pixels PXL, and the second power source line PL2 for supplying a low-potential pixel voltage to the pixels PXL. In FIG. 3, only the second power source line PL2 is shown as an example of the power source lines formed on (or as part of) the display panel 110. In an embodiment, the second power source line PL2 may be formed in the non-display area NA to surround the display area DA.

Pads electrically connected to the signal lines SLI and the power source line PL may be further disposed in the non-display area NA. The pads may be provided in a pad area PA and may be electrically connected to a circuit board 201 bonded on the pad area PA.

The circuit board 201 may include at least a portion of the driving circuit unit 200 or may be electrically connected to the driving circuit unit 200. For example, the display driver 210, the touch driver 220, and the PMIC 230 may be mounted on the circuit board 201 or electrically connected to the display panel 110 via the circuit board 201.

Figure 4:
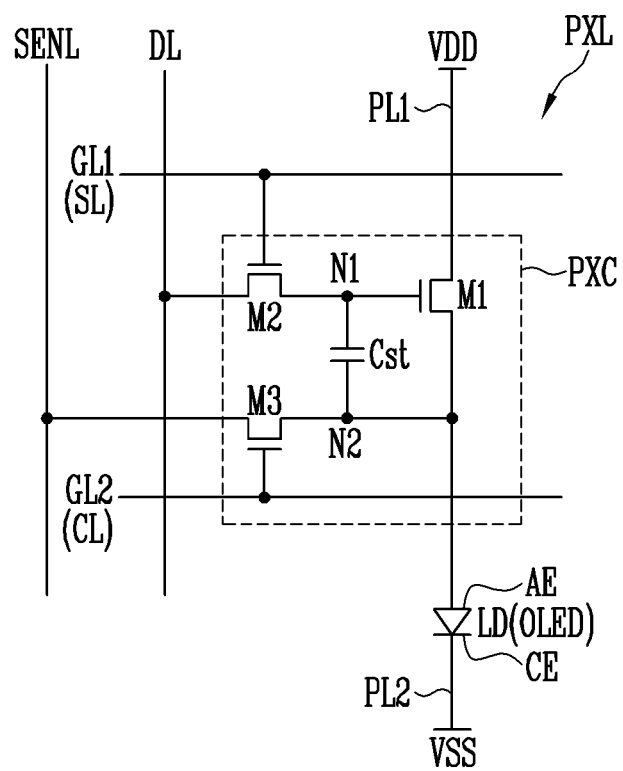
FIG. 4 is a circuit diagram illustrating a pixel according to an embodiment.

FIG. 4 is a circuit diagram illustrating a pixel PXL according to an embodiment.

Referring to FIGS. 3 and 4, the pixel PXL according to an embodiment may include a pixel circuit PXC and a light emitting element LD electrically connected between the first power source line PL1 and the second power source line PL2. A first pixel voltage (for example, a high-potential pixel voltage) VDD may be applied to the first power source line PL1, and a second pixel voltage (for example, a low-potential pixel voltage) VSS may be applied to the second power source line PL2.

The pixel circuit PXC may be electrically connected between the first power source line PL1 and the light emitting element LD. Also, the pixel circuit PXC may be electrically connected to at least one gate line GL and data line DL, and may be further selectively connected to a sensing line SENL. For example, the pixel circuit PXC may be electrically connected to a first gate line GL1 (for example, a scan line SL connected to pixels PXL of a corresponding pixel row), a second gate line GL2 (for example, a control line CL connected to the pixels PXL of the corresponding pixel row), a data line DL (for example, a data line DL connected to pixels PXL of a corresponding pixel column), and a sensing line SENL (for example, a sensing line SENL connected to the pixels PXL of the corresponding pixel column).

The pixel circuit PXC may include at least one transistor and a capacitor. For example, the pixel circuit PXC may include a first transistor M1, a second transistor M2, a third transistor M3, and a storage capacitor Cst.

The first transistor M1 may be electrically connected between the first power source line PL1 and a first electrode AE (for example, an anode electrode) of the light emitting element LD. A gate electrode of the first transistor M1 may be electrically connected to a first node N1. The first transistor M1 may control driving current supplied to the light emitting element LD in response to a voltage of the first node N1. For example, the first transistor M1 may be a driving transistor that controls the driving current of the pixel PXL.

The second transistor M2 may be electrically connected between the data line DL and the first node N1. A gate electrode of the second transistor M2 may be electrically connected to the first gate line GL1. The second transistor M2 may be turned on when (or in response to) a first gate signal (for example, a scan signal) of a gate-on voltage (for example, a high-level voltage) is supplied from the first gate line GL1 to electrically connect the data line DL and the first node N1.

For each frame period, a data signal of a corresponding frame may be supplied to the data line DL, and the data signal may be transferred to the first node N1 through the second transistor M2 turned on during a period in which the first gate signal of the gate-on voltage is supplied. For example, the second transistor M2 may be a switching transistor for transferring each data signal to inside the pixel PXL.

The storage capacitor Cst may be electrically connected between the first node N1 and a second node N2. The second node N2 may be a node to which the first transistor M1 and the light emitting element LD are connected. The storage capacitor Cst may be charged with a voltage corresponding to the data signal supplied to the first node N1.

The third transistor M3 may be electrically connected between the second node N2 and the sensing line SENL. A gate electrode of the third transistor M3 may be electrically connected to the second gate line GL2.

The third transistor M3 may be turned on in response to a second gate signal of the gate-on voltage supplied to the second gate line GL2 to transfer an initialization voltage supplied to the sensing line SENL to the second node N2, or to transfer a voltage of the second node N2 to the sensing line SENL. The voltage of the second node N2 sensed through the sensing line SENL during a sensing period may be provided to an external circuit (for example, a timing controller) and used to compensate for deterioration and/or characteristic deviation of the pixels PXL.

In FIG. 4, transistors included in the pixel circuit PXC, for example, the first, second, and third transistors M1, M2, and M3 are all shown as N-type transistors, but embodiments are not limited thereto. For example, at least one of the first, second, and third transistors M1, M2, and M3 may be changed to a P-type transistor.

The structure and driving method of the pixel PXL may be variously changed according to embodiments. For example, the pixel circuit PXC may be composed of a pixel circuit having various structures and/or driving methods in addition to the embodiment shown in FIG. 4.

For example, the pixel circuit PXC may not include the third transistor M3. In addition, the pixel circuit PXC may further include other circuit elements, such as a compensation transistor for compensating for a threshold voltage of the first transistor M1, at least one initialization transistor for initializing the voltage of the first node N1 and/or the second node N2, an emission control transistor for controlling a period during which the driving current is supplied to the light emitting element LD, and/or a boosting capacitor for boosting the voltage of the first node N1. In another embodiment, when the pixel PXL is a pixel of a passive light emitting display device, the pixel circuit PXC may be omitted.

The light emitting element LD may include the first electrode AE, a second electrode CE, and a light emitting layer disposed between the first electrode AE and the second electrode CE. In an embodiment, the light emitting element LD may be an organic light emitting diode (OLED) including an organic light emitting layer.

The first electrode AE of the light emitting element LD may be electrically connected to the first power source line PL1 through the pixel circuit PXC. The second electrode CE of the light emitting element LD may be electrically connected to the second power source line PL2. In an embodiment, the first electrode AE of the light emitting element LD may be the anode electrode, and the second electrode CE of the light emitting element LD may be a cathode electrode.

When the driving current is supplied from the pixel circuit PXC, the light emitting element LD may emit light with a luminance corresponding to the driving current. Accordingly, each pixel PXL may emit light with a luminance corresponding to the data signal supplied to the first node N1 during each frame period.

FIG. 5 is a plan view illustrating a touch sensor 120 according to an embodiment.

Referring to FIG. 5, the touch sensor 120 according to an embodiment may include a base layer BL and the sensor electrodes SSE disposed on the base layer BL.

The base layer BL may be a base member for forming the touch sensor 120. For example, the base layer BL may constitute a base surface of the touch sensor 120.

In an embodiment, the touch sensor 120 may be integrally formed with the display panel 110. For example, the touch sensor 120 may be directly formed on the display panel 110. In this case, the display panel 110 (or an encapsulation layer of the display panel 110) may be the base layer BL of the touch sensor 120.

The base layer BL and the touch sensor 120 including the same may include a sensing area SA and a peripheral area NSA (for example, a non-sensing area). The sensing area SA may be an area in which the sensing signals are output in response to the touch input, and the peripheral area NSA may be an area other than the sensing area SA.

In an embodiment, the sensing area SA may correspond to the display area DA, and the peripheral area NSA may correspond to the non-display area NA. For example, the sensing area SA may overlap the display area DA, and the peripheral area NSA may overlap the non-display area NA.

The sensor electrodes SSE may be disposed in the sensing area SA. In an embodiment, the sensor electrodes SSE may include first sensor electrodes ET1 and second sensor electrodes ET2.

In an embodiment, the first sensor electrodes ET1 and the second sensor electrodes ET2 may extend in different directions. For example, the first sensor electrodes ET1 and the second sensor electrodes ET2 may extend along the first direction DR1 and the second direction DR2, respectively, and may cross each other.

In an embodiment, each of the sensor electrodes SSE may include electrode cells EP (also referred to as electrode units) and connection portions CP (also referred to as connection patterns). Although the electrode cells EP are shown in plate-shaped patterns in FIG. embodiments are not limited thereto. For example, the electrode cells EP may be formed in mesh patterns.

In an embodiment, each of the first sensor electrodes ET1 may include first electrode cells EP1 and first connection portions CP1. The first electrode cells EP1 may be arranged (e.g., spaced apart from one another) along the first direction DR1. The first connection portions CP1 may connect adjacent first electrode cells EP1. The first connection portions CP1 may be integrally formed with the first electrode cells EP1 or may be formed of bridge-shaped conductive patterns.

In an embodiment, each of the second sensor electrodes ET2 may include second electrode cells EP2 and second connection portions CP2. The second electrode cells EP2 may be arranged along the second direction DR2. The second connection portions CP2 may connect the second electrode cells EP2. The second connection portions CP2 may be integrally formed with the second electrode cells EP2 or may be formed of bridge-shaped conductive patterns.

The configuration, structure, shape, size, and/or position of the sensor electrodes SSE may be variously changed according to embodiments. In addition, the sensor electrodes SSE may include at least one conductive material, and the material constituting the sensor electrodes SSE is not particularly limited.

In a case that the touch sensor 120 according to an embodiment is a mutual capacitance type touch sensor, one group of electrodes among the first sensor electrodes ET1 and the second sensor electrodes ET2 may be driving electrodes of the touch sensor 120, and the remaining group of electrodes may be sensing electrodes of the touch sensor 120. For example, the first sensor electrodes ET1 may be the driving electrodes of the touch sensor 120 (for example, Tx electrodes receiving a touch driving signal from the touch driver 220 during the sensing period in which the touch sensor 120 is activated), and the second sensor electrodes ET2 may be the sensing electrodes of the touch sensor 120 (for example, Rx electrodes outputting a sensing signal corresponding to the touch input to the touch driver 220 during the sensing period in which the touch sensor 120 is activated).

In an embodiment, the touch sensor 120 may further include dummy patterns DMP. For example, the touch sensor 120 may include the dummy patterns DMP disposed on an edge of the sensing area SA and floated.

Touch lines TLI electrically connected to the sensor electrodes SSE may be disposed in the peripheral area NSA. Each of the touch lines TLI may be electrically connected to any one sensor electrode SSE (for example, any one of the first sensor electrode ET1 or the second sensor electrode ET2).

Pads TP electrically connected to the touch lines TLI may be further disposed in the peripheral area NSA. The touch sensor 120 may be electrically connected to the touch driver 220 through the pads TP.

Figure 6:
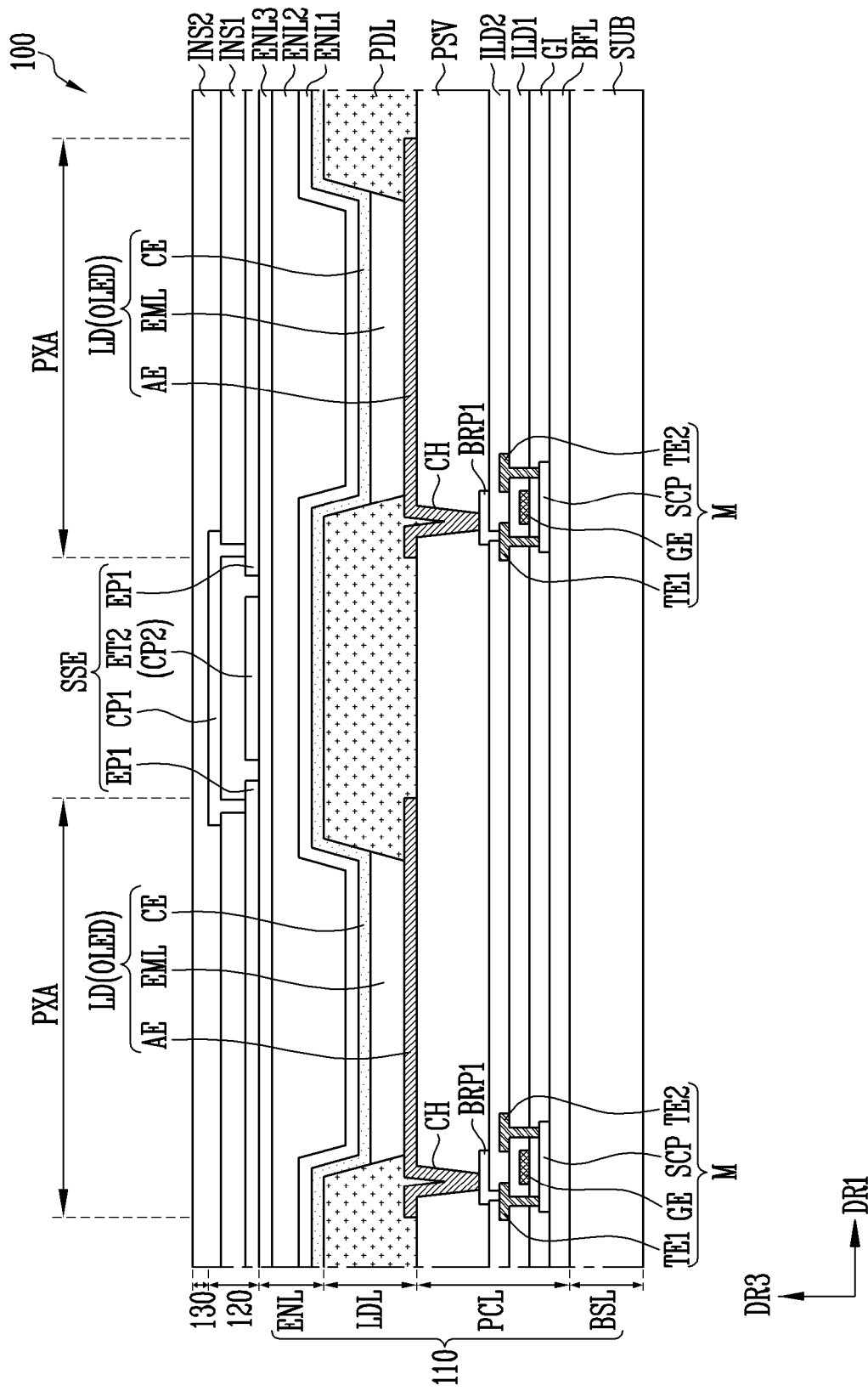
FIG. 6 is a cross-sectional view illustrating the panel unit of the display device according to an embodiment.

FIG. 6 is a cross-sectional view illustrating the panel unit 100 of the display device 10 according to an embodiment. For example, FIG. 6 schematically shows a cross-section of the panel unit 100 centered on pixel areas PXA in which two pixels PXL including the light emitting element LD (for example, the organic light emitting diode OLED) are disposed as in the embodiment of FIG. 4. Each pixel area PXA may include an area in which circuit elements and/or the light emitting element LD constituting a corresponding pixel PXL are disposed.

Referring to FIGS. 1 to 6, the panel unit 100 may include the display panel 110, the touch sensor 120, and the protective layer 130 sequentially arranged along the third direction DR3.

The display panel 110 may include the substrate SUB, and a pixel circuit layer PCL, a light emitting element layer LDL, and an encapsulation layer ENL sequentially disposed on the substrate SUB. The substrate SUB may constitute the base layer BSL of the panel unit 100.

The pixel circuit layer PCL may include the circuit elements constituting the pixel circuit PXC of each of the pixels PXL, and the signal lines SLI and power source lines PL electrically connected to the pixels PXL. In FIG. 6, as an example of the circuit elements that may be disposed in the pixel circuit layer PCL, a transistor M (for example, the first transistor M1 of FIG. 4) electrically connected to the light emitting element LD through contact hole CH and/or first bridge pattern BRP1 is shown.

The pixel circuit layer PCL may further include insulating layers. For example, the pixel circuit layer PCL may include a buffer layer BFL, a gate insulating layer GI, a first interlayer insulating layer ILD1, a second interlayer insulating layer ILD2, and/or a passivation layer PSV.

The buffer layer BFL may be disposed on the substrate SUB. The buffer layer BFL may prevent impurities from diffusing into each circuit element.

A semiconductor layer may be disposed on the buffer layer BFL. The semiconductor layer may include a semiconductor pattern SCP of each transistor M. The semiconductor pattern SCP may include a channel region overlapping a gate electrode GE of a corresponding transistor M, and first and second conductive regions (for example, source and drain regions) disposed on both sides of the channel region.

The gate insulating layer GI may be disposed on the semiconductor layer. In addition, a first conductive layer may be disposed on the gate insulating layer GI.

The first conductive layer may include a gate electrode GE of each transistor M. The first conductive layer may further include one electrode of the storage capacitor Cst, at least one line or a portion thereof, and/or a bridge pattern.

The first interlayer insulating layer ILD1 may be disposed on the first conductive layer. In addition, a second conductive layer may be disposed on the first interlayer insulating layer ILD1.

The second conductive layer may include first and second transistor electrodes TE1 and TE2 of each transistor M. Here, the first and second transistor electrodes TE1 and TE2 may be source and drain electrodes. In addition, the second conductive layer may further include another electrode of the storage capacitor Cst, at least one line or a portion thereof, and/or a bridge pattern.

The second interlayer insulating layer ILD2 may be disposed on the second conductive layer. In addition, a third conductive layer may be disposed on the second interlayer insulating layer ILD2.

The third conductive layer may include at least one bridge pattern including the first bridge pattern BRP1 for electrically connecting the pixel circuit layer PCL and the light emitting element layer LDL. In addition, the third conductive layer may further include at least one line or a portion thereof.

The first bridge pattern BRP1 may be electrically connected to the first electrode AE of the light emitting element LD of the corresponding pixel PXL through the contact hole CH. Also, the first bridge pattern BRP1 may be electrically connected to at least one circuit element (for example, the first transistor M1 of FIG. 4) constituting the pixel circuit PXC of the corresponding pixel PXL.

The passivation layer PSV may be disposed on the third conductive layer. In addition, the light emitting element layer LDL may be disposed on the pixel circuit layer PCL including the passivation layer PSV.

The light emitting element layer LDL may include light emitting elements LD of the pixels PXL. Also, the light emitting element layer LDL may further include an insulating layer and/or an insulating pattern (for example, a pixel defining layer PDL) disposed around the light emitting elements LD.

In an embodiment, in a case that the light emitting element LD of the pixel PXL is an organic light emitting diode OLED, the light emitting element layer LDL may include the organic light emitting diode OLED formed in each pixel area PXA. The light emitting element LD may include a first electrode AE, a second electrode CE, and a light emitting layer EML disposed between the first electrode AE and the second electrode CE. Hereinafter, the first electrode AE of the light emitting element LD may be referred to as a first pixel electrode AE, and the second electrode CE of the light emitting element LD may be referred to as a second pixel electrode CE.

Any one of the first pixel electrode AE and the second pixel electrode CE may be the anode electrode of the light emitting element LD, and the other may be the cathode electrode of the light emitting element LD. For example, the first pixel electrode AE may be the anode electrode of the light emitting element LD, and the second pixel electrode CE may be the cathode electrode of the light emitting element LD.

The first pixel electrode AE may be electrically connected to the circuit element of the pixel circuit layer PCL (for example, the transistor M1 of FIG. 4) through the contact hole CH passing through the passivation layer PSV and/or the first bridge pattern BRP1.

The light emitting element layer LDL may further include the pixel defining layer PDL disposed between the pixel areas PXA. The pixel defining layer PDL may include an opening exposing at least a portion of the first pixel electrode AE of each of the pixels PXL. In an embodiment, the pixel defining layer PDL may be an organic insulating layer including an organic material.

The light emitting layer EML may be disposed in an area corresponding to the opening of the pixel defining layer PDL. For example, the light emitting layer EML may be disposed on one surface of the exposed portion of the first pixel electrode AE. In an embodiment, the light emitting layer EML may have a multi-layered thin film structure including a light generation layer. For example, the light emitting layer EML may include a hole injection layer, a hole transport layer, a light generation layer, a hole blocking layer, an electron transport layer, and/or an electron injection layer.

The light generation layer may be independently formed in each pixel area PXA (for example, a light emitting area of each pixel PXL), and the hole injection layer, the hole transport layer, the hole blocking layer, the electron transport layer, and the electron injection layer may be common layers connected to each other in light emitting areas adjacent to each other. FIG. 6 shows the light emitting layer EML based on the light generation layer.

The second pixel electrode CE may be provided and/or formed on the light emitting layer EML. In an embodiment, the second pixel electrode CE may be a common electrode commonly provided to the pixels PXL. For example, the second pixel electrode CE may be a plate-shaped electrode formed in the entire display area DA, and the light emitting elements LD of the pixels PXL may be commonly connected to one second pixel electrode CE.

The encapsulation layer ENL may be disposed and/or formed on the light emitting element layer LDL including the light emitting elements LD of the pixels PXL.

The encapsulation layer ENL may be formed of a single layer or multiple layers. In an embodiment, the encapsulation layer ENL may include a plurality of insulating layers covering the light emitting element layer LDL. For example, the encapsulation layer ENL may include a first encapsulation layer ENL1, a second encapsulation layer ENL2, and a third encapsulation layer ENL3 sequentially disposed on the light emitting element layer LDL. In an embodiment, the first encapsulation layer ENL1 and the third encapsulation layer ENL3 may be inorganic insulating layers, and the second encapsulation layer ENL2 may be an organic insulating layer. The material and/or structure of the encapsulation layer ENL may be changed according to embodiments.

The touch sensor 120 (also referred to as a sensor layer or the sensor unit) may include the sensor electrodes SSE disposed on the display panel 110. In an embodiment, the sensor electrodes SSE may include the first sensor electrodes ET1 and the second sensor electrodes ET2 crossing each other as shown in FIG. 5, and a first insulating layer INS1 may be disposed at intersections of the first sensor electrodes ET2ET1 and the second sensor electrodes ET2. In an embodiment, the first insulating layer INS1 may be formed on the entire sensing area SA, and may include contact holes for electrically connecting each of the first connection portions CP1 (or each of the second connection portions CP2) to each of the first electrode cells EP1 (or each of the second electrode cells EP2). In another embodiment, the first insulating layer INS1 may be an island-shaped insulating pattern(s) independently disposed at the intersections of the first sensor electrodes ET1 and the second sensor electrodes ET2 (for example, intersections of the first connection portions CP1 and the second connection portions CP2).

The protective layer 130 may be disposed on the touch sensor 120. For example, the protective layer 130 may be formed over the entire sensing area SA to overlap the sensor electrodes SSE. The protective layer 130 may also be formed on at least a portion of the peripheral area NSA. The protective layer 130 may include at least one insulating layer including a second insulating layer INS2.

In an embodiment, the panel unit 100 may further include at least one of a color filter layer and/or a color conversion layer. The color filter layer may overlap each of the light emitting elements LD of the pixels PXL and may include color filters of the color corresponding to each of the pixels PXL. The color conversion layer may include color conversion patterns overlapping the light emitting elements LD provided in at least some of the pixels PXL and including wavelength conversion particles (for example, quantum dots) of the color corresponding to each of the at least some of the pixels PXL. In an embodiment, the color conversion layer may further include light scattering particles for increasing light efficiency of the pixels PXL.

Figure 7:
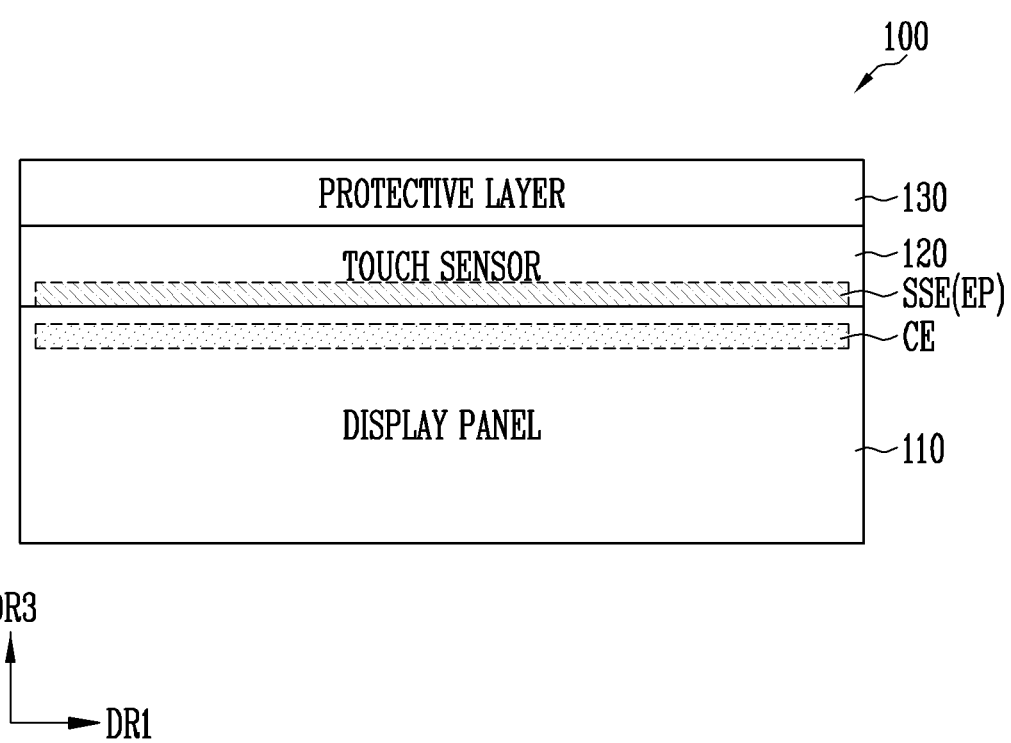
FIG. 7 is a cross-sectional view schematically illustrating an arrangement structure of a second pixel electrode of a display panel and sensor electrodes of the touch sensor according to an embodiment.

FIG. 7 is a cross-sectional view schematically illustrating an arrangement structure of a second pixel electrode CE of the display panel 110 and sensor electrodes SSE of the touch sensor 120 according to an embodiment.

Referring to FIGS. 1 to 7, the second pixel electrode CE and the sensor electrodes SSE may be disposed to overlap each other. For example, the second pixel electrode CE and the sensor electrodes SSE may be spaced apart from each other with the encapsulation layer ENL of the display panel 110 interposed therebetween, and may overlap each other in the display area DA and the sensing area SA.

A parasitic capacitance may be generated between the second pixel electrode CE and the sensor electrodes SSE, and the parasitic capacitance may affect the sensing signals output from the touch sensor 120. For example, noise may be included in the sensing signals due to the parasitic capacitance formed between the electrode cells EP of the sensor electrodes SSE and the second pixel electrode CE. The magnitude and/or aspect of the noise included in the sensing signals may vary according to electrical characteristics of the second pixel electrode CE (for example, an impedance value of the second pixel electrode CE). As the second pixel electrode CE and the sensor electrodes SSE are disposed closer together, the influence of the second pixel electrode CE on the sensing signals of the touch sensor 120 may increase.

Figure 8:
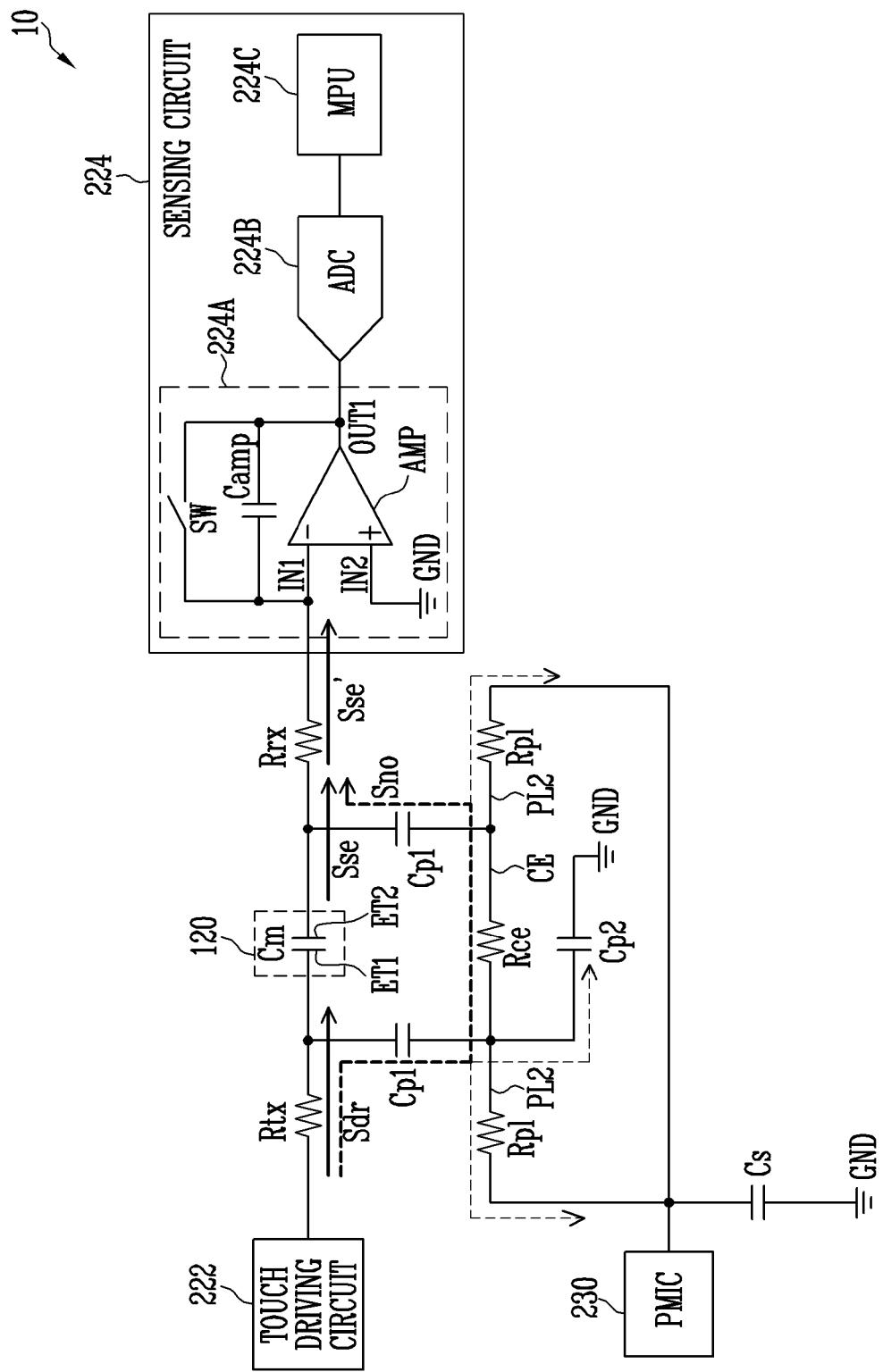
FIG. 8 is a diagram illustrating the display device centered on the touch sensor according to an embodiment.

FIG. 8 is a diagram illustrating the display device 10 centered on the touch sensor 120 according to an embodiment. For instance, FIG. 8 shows an equivalent circuit of the panel unit 100 centered on a pair of first and second sensor electrodes ET1 and ET2. For example, FIG. 8 shows a mutual capacitance Cm formed between the pair of first and second sensor electrodes ET1 and ET2 in the touch sensor 120. A method of driving the touch sensor 120 will be described centered on the mutual capacitance Cm. In addition, FIG. 8 shows a touch driving circuit 222 (for example, a Tx circuit) and a sensing circuit 224 (for example, an Rx circuit) electrically connected to the touch sensor 120.

Figure 9:
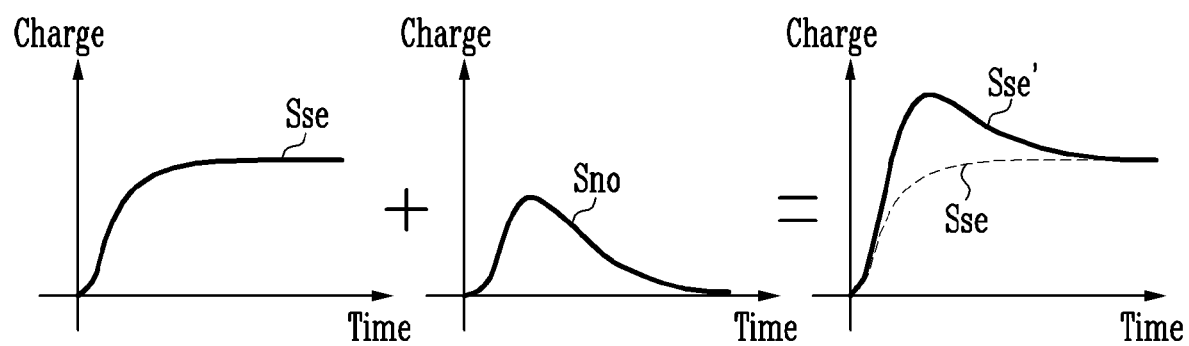
FIG. 9 is a graph illustrating a sensing signal generated by a mutual capacitance of the touch sensor, a noise signal generated by the second pixel electrode, and a sensing signal input to a sensing circuit according to an embodiment.

FIG. 9 is a graph illustrating a sensing signal Sse generated by a mutual capacitance Cm of the touch sensor 120, a noise signal Sno generated by the second pixel electrode CE, and a sensing signal Sse' input to a sensing circuit 224 according to an embodiment.

First, referring to FIGS. 1 to 8, the touch sensor 120 may include at least a pair of the first sensor electrode ET1 and the second sensor electrode ET2 that form the mutual capacitance Cm. The first sensor electrode ET1 may be electrically connected to the touch driving circuit 222, and the second sensor electrode ET2 may be electrically connected to the sensing circuit 224. In an embodiment, the touch driving circuit 222 and the sensing circuit 224 may be integrated together within the touch driver 220.

A method of driving the touch sensor 120 according to an embodiment will be described later. During a period in which the touch sensor 120 is activated, a touch driving signal Sdr may be supplied from the touch driving circuit 222 to the first sensor electrode ET1. In an embodiment, the touch driving signal Sdr may be an alternating current (AC) signal. When the touch sensor 120 includes a plurality of first sensor electrodes ET1, the touch driving circuit 222 may sequentially supply the touch driving signal Sdr to the first sensor electrodes ET1.

When the touch driving signal Sdr is supplied to the first sensor electrode ET1, the sensing signal Sse corresponding to the touch driving signal Sdr may be output through the second sensor electrode ET2 in which the mutual capacitance Cm is formed between the first sensor electrode ET1 and the second sensor electrode ET2. The sensing signal Sse may be input to the sensing circuit 224 and used to detect the touch input. The noise signal Sno may also be input to the sensing circuit 224 together with the sensing signal Sse by the mutual capacitance Cm. When the touch sensor 120 includes a plurality of second sensor electrodes ET2, the sensing circuit 224 may include a plurality of sensing channels (for example, Rx channels including receivers 224A) electrically connected to each of the second sensor electrodes ET2. The sensing circuit 224 may receive sensing signals Sse' (for example, signals including the sensing signal Sse by the mutual capacitance Cm and the noise signal Sno) from the touch sensor 120 through the sensing channels.

The sensing circuit 224 may amplify, convert, and signal-process the sensing signals Sse' input from the second sensor electrodes ET2, and detect the touch input according to the result. To this end, the sensing circuit 224 may include the receivers 224A electrically connected to the second sensor electrodes ET2, at least one analog-to-digital converter 224B (hereinafter referred to as "ADC") connected to the receivers 224A, and a processor 224C.

Each of the receivers 224A may be an analog front end (hereinafter referred to as "AFE") that receives the sensing signal Sse' (for example, the sensing signal Sse' including the noise signal Sno) from the second sensor electrode ET2 connected thereto. In an embodiment, each receiver 224A may be configured as an AFE including an amplifier AMP, such as an operational amplifier (OPA).

According to an embodiment, a first input terminal IN1 (for example, an inverting input terminal) of the amplifier AMP may be electrically connected to a corresponding second sensor electrode ET2, and a second input terminal IN2 (for example, a non-inverting input terminal) of the amplifier AMP may be connected to a reference voltage source such as a ground voltage source GND. In this case, each receiver 224A may amplify and output the sensing signal Sse' input to the first input terminal IN1 based on the potential of the second input terminal IN2. For instance, each receiver 224A may receive the sensing signal Sse' from the second sensor electrode ET2 through the first input terminal IN1, and may amplify the sensing signal Sse' by amplifying and outputting a signal corresponding to a difference between a voltage of the first input terminal IN1 and a voltage of the second input terminals IN2.

In an embodiment, the amplifier AMP may be implemented as an integrator. In this case, a capacitor Camp and a reset switch SW may be connected in parallel between the first input terminal IN1 and an output terminal OUT1 of the amplifier AMP.

The ADC 224B may convert an analog signal input from each receiver 224A into a digital signal.

The processor 224C may signal-process the digital signal converted by the ADC 224B, and may detect the touch input according to the signal processing result. For example, the processor 224C may detect whether a touch input has occurred and a location thereof by synthesizing signals (amplified and digitally converted sensing signal Sse') input from the second sensor electrodes ET2 via each of the receivers 224A and the ADC(s) 224B.

In an embodiment, the processor 224C may be a microprocessor (MPU). In another embodiment, the processor 224C may be another type of processor, such as a microcontroller (MCU).

As described above, the touch sensor 120 may output the sensing signals Sse' of a waveform corresponding to touch driving signals Sdr. A parasitic capacitance may be formed between the touch sensor 120 and the display panel 110. Accordingly, noise signals Sno may be added to sensing signals Sse according to the mutual capacitance Cm of the touch sensor 120 and input to the sensing circuit 224. Accordingly, an input signal of the sensing circuit 224 (for example, the sensing signal Sse' input to the sensing circuit 224) may be distorted.

For example, a first parasitic capacitance Cp1 may be generated between the touch sensor 120 and the second pixel electrode CE. Accordingly, some of charges flowing from the touch driving circuit 222 to the touch sensor 120 may move to the second pixel electrode CE.

Some of the charges that have moved to the second pixel electrode CE may be retransmitted to the second sensor electrode ET2 through the second pixel electrode CE and the first parasitic capacitance Cp1, and may be input to the sensing circuit 224 by being added to the sensing signal Sse by the mutual capacitance Cm. Accordingly, the sensing signal Sse' in a form in which the noise signal Sno is added to the sensing signal Sse by the mutual capacitance Cm of the touch sensor 120 may be input to the sensing circuit 224. For example, as shown in FIG. 9, the amount of charges of the sensing signal Sse' input to the sensing circuit 224 (or a voltage of the sensing signal Sse' corresponding thereto) may have a value obtained by adding the amount of charges of the noise signal Sno generated by the second pixel electrode CE (or a voltage of the noise signal Sno corresponding thereto) to the amount of charges corresponding to the sensing signal Sse by the mutual capacitance of the touch sensor 120 (or a voltage of the sensing signal Sse corresponding thereto).

Another portion of the charges that have moved to the second pixel electrode CE may be moved to a second parasitic capacitance Cp2 formed by the second pixel electrode CE (for example, a parasitic capacitance formed between a shielding electrode of a display module (for example, a module including the display device 10) connected to the reference voltage source, such as the ground voltage source GND, and the second pixel electrode CE), or a stabilization capacitor Cs electrically connected to the second pixel electrode CE.

In FIG. 8, a dotted arrow schematically indicates a flow of the charges moving to the second pixel electrode CE. With respect to reference numerals not described in FIG. 8, the reference numeral Rtx equivalently denotes the resistance of the first sensor electrode ET1 and/or a touch line TLI connected to the first sensor electrode ET1, and the reference numeral Rrx equivalently denotes the resistance of the second sensor electrode ET2 and/or a touch line TLI connected to the second sensor electrode ET2. The reference numeral Rce equivalently denotes the resistance of the second pixel electrode CE, and the reference numeral Rpl equivalently denotes the resistance of the second power source line PL2.

The magnitude and/or waveform of the noise signal Sno generated by the second pixel electrode CE may vary according to electrical characteristics of the second pixel electrode CE. For example, the magnitude and/or waveform of the noise signal Sno may be changed according to the impedance value of the second pixel electrode CE and/or the second power source line PL2 connected to the second pixel electrode CE.

Accordingly, according to the impedance value of the second pixel electrode CE, a value of the sensing signal generated and/or output from the sensing circuit 224 (for example, a digital code value corresponding to the capacitance converted by the ADC 224B) may be changed.

Figure 10:
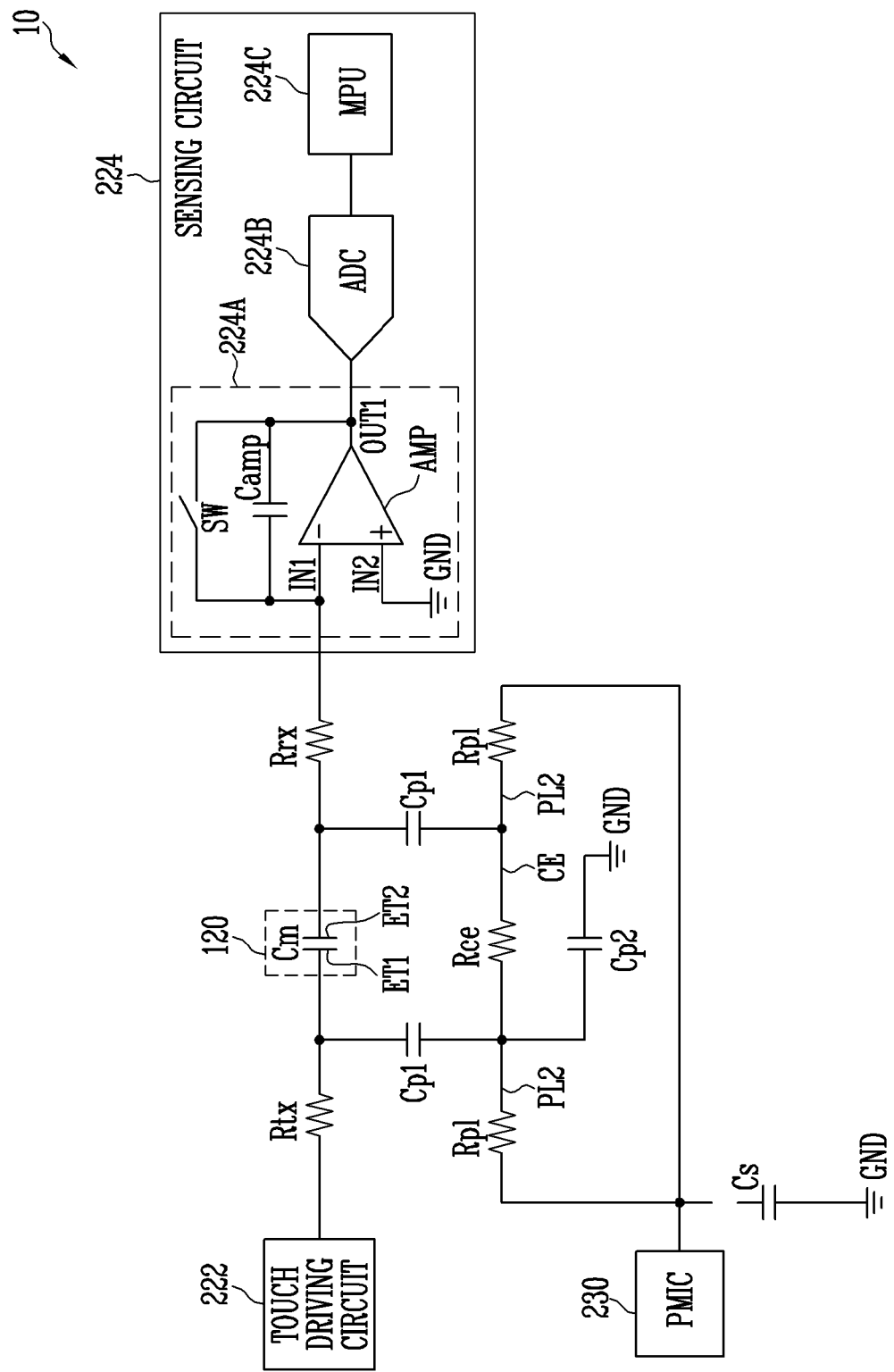
FIG. 10 is a diagram illustrating the display device including a first type of defect in relation to the second pixel electrode.
Figure 11:
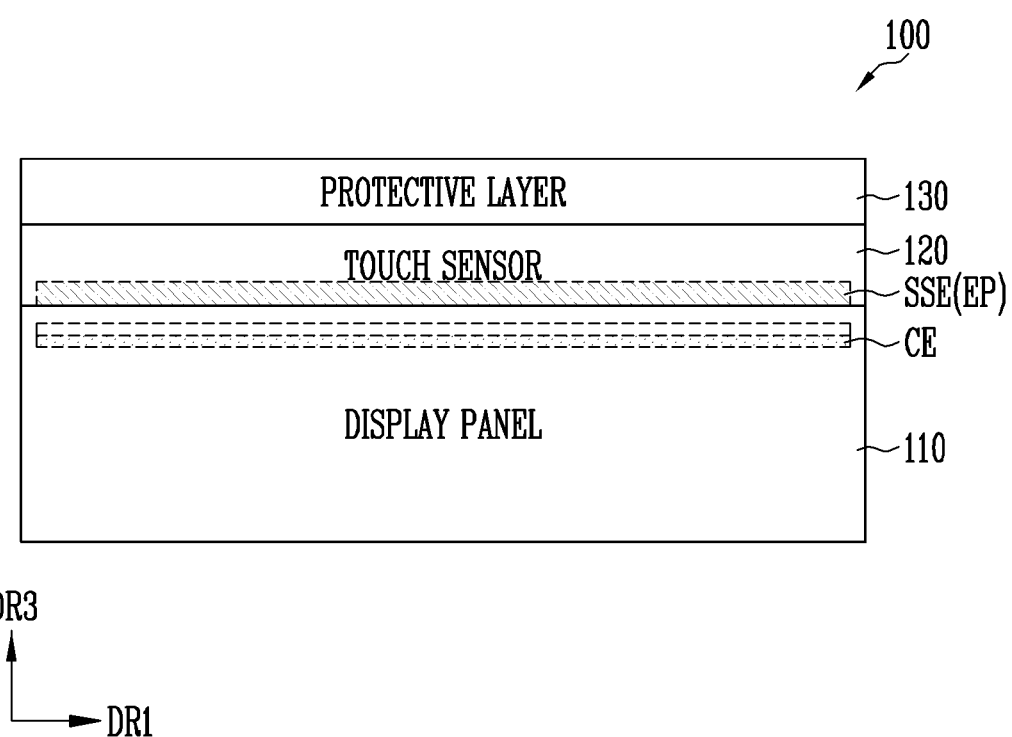
FIG. 11 is a diagram illustrating the panel unit including a second type of defect in relation to the second pixel electrode.
Figure 12:
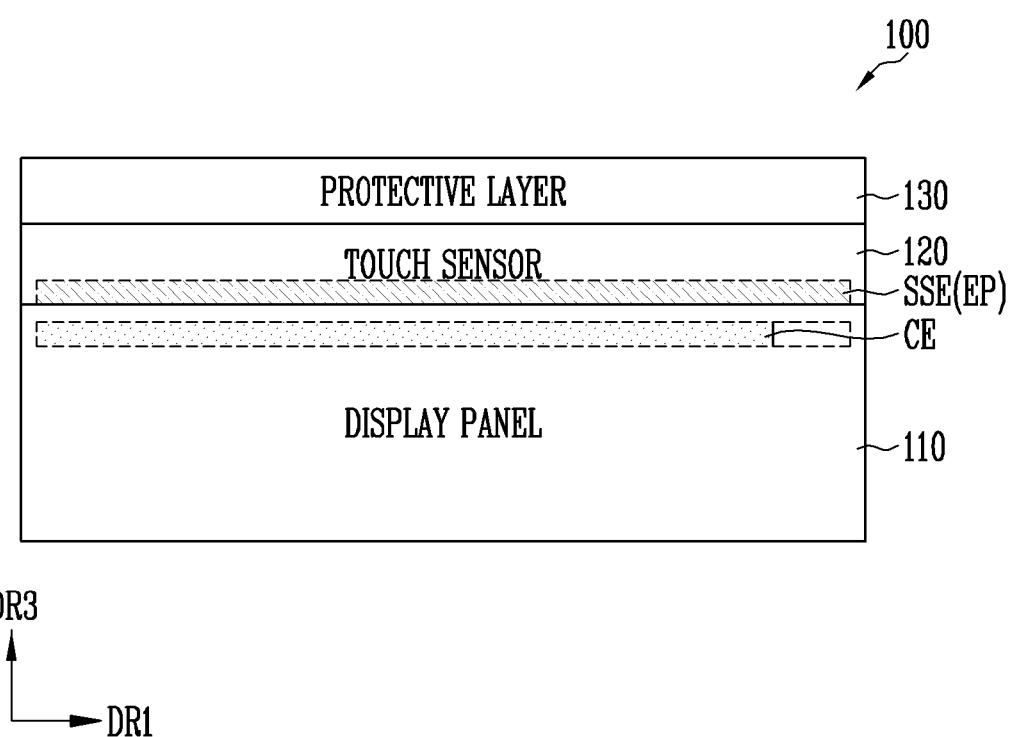
FIG. 12 is a diagram illustrating the panel unit including a third type of defect in relation to the second pixel electrode.

FIG. 10 is a diagram illustrating the display device 10 including a first type of defect in relation to the second pixel electrode CE. In FIG. 10, as shown in FIG. 8, the display device 10 according to an embodiment is shown centered on the touch sensor 120. FIG. 11 is a diagram illustrating the panel unit 100 including a second type of defect in relation to the second pixel electrode CE. FIG. 12 is a diagram illustrating the panel unit 100 including a third type of defect in relation to the second pixel electrode CE.

Referring to FIGS. 1 to 10, the stabilization capacitor Cs to be electrically connected to an output terminal of the PMIC 230 and the second power source line PL2 may be separated from the second power source line PL2. For example, during a manufacturing process of the display device 10 including a module process and an inspection process, the connection between the stabilization capacitor Cs and the second power source line PL2 may be disconnected. As the stabilization capacitor Cs is separated from the second power source line PL2, impedance values of the second pixel electrode CE and the second power source line PL2 connected thereto may vary. Accordingly, the amount of charges retransmitted from the second pixel electrode CE to the second sensor electrode ET2 may increase, and thus, the performance of the touch sensor 120 may be deteriorated.

Referring to FIGS. 1 to 12, due to a film formation defect of the second pixel electrode CE, the impedance values of the second pixel electrode CE and the second power source line PL2 connected thereto may vary. For example, the amount of charges retransmitted from the second pixel electrode CE to the second sensor electrode ET2 may increase, and thus, the performance of the touch sensor 120 may be deteriorated.

For example, as shown in FIG. 11, when the thickness of the second pixel electrode CE is changed, a resistance value of the second pixel electrode CE may be changed, and the distance between the second pixel electrode CE and the touch sensor 120 may be changed. Accordingly, a value of the first parasitic capacitance Cp1 may be changed such that the level and/or waveform of the sensing signal Sse' input to the sensing circuit 224 may be changed. Also, when the resistance value of the second pixel electrode CE increases, image quality may deteriorate due to a voltage drop of the second pixel voltage VSS.

Alternatively, in some display devices 10, as shown in FIG. 12, the second pixel electrode CE may not be formed in a portion of the display area DA due to a film formation defect of the second pixel electrode CE that may occur in a process of forming the second pixel electrode CE. For example, due to a shift of a mask in a photolithography process, the second pixel electrode CE may not be formed in an edge area of the display area DA.

In this case, in an area where the second pixel electrode CE is not formed, display noise may be introduced from the display panel 110 to the touch sensor 120. Accordingly, the level and/or waveform of the sensing signal Sse' input to the sensing circuit 224 may be changed. For example, a larger display noise may be introduced into the second sensor electrodes ET2 at a position corresponding to the area where the second pixel electrode CE is not formed such that a higher level noise signal Sno may be included in the sensing signals Sse' input to the receivers 224A of the RX channels connected to the second sensor electrodes ET2. Accordingly, the performance of the touch sensor 120 may be deteriorated.

Figure 13:
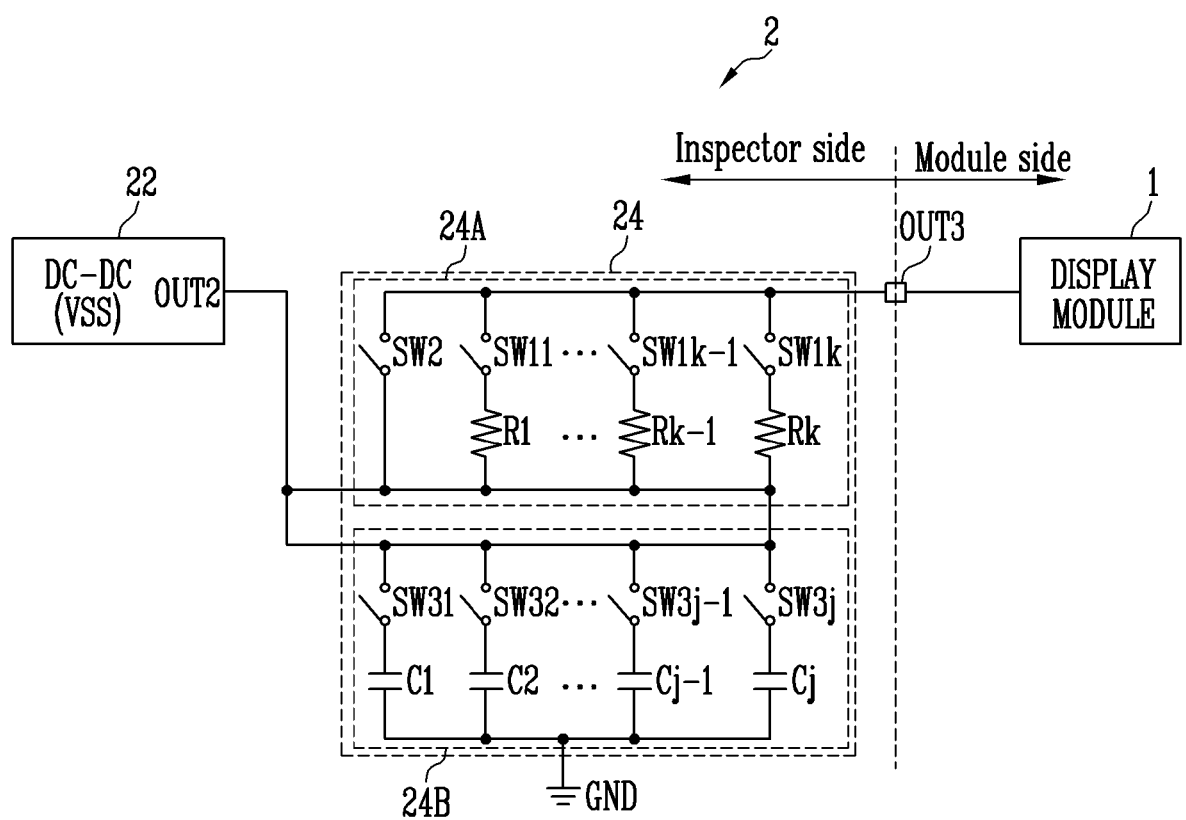
FIG. 13 is a diagram illustrating an inspection apparatus of the display device according to an embodiment.
Figure 14:
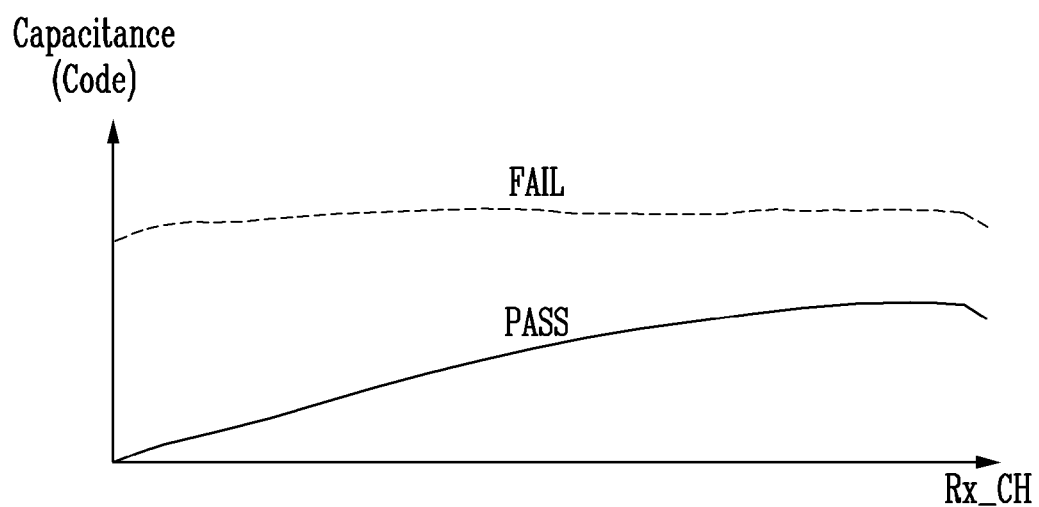
FIG. 14 is a graph illustrating capacitance values of sensing signals output from a touch sensor of the display device according to an embodiment.

FIG. 13 is a diagram illustrating an inspection apparatus 2 of the display device 10 according to an embodiment. For example, FIG. 13 shows the inspection apparatus 2 electrically connected to a display module 1 including the display device 10 (or a sample display device of the same model as the display device 10) according to an embodiment and used to inspect a defect of the display device 10. FIG. 14 is a graph illustrating capacitance values of the sensing signals output from the touch sensor 120 of the display device 10. For example, FIG. 14 shows a code value of the capacitance output from the ADC 224B provided to each of reception channels Rx_CH connected to the second sensor electrodes ET2 (for example, Rx channels of the sensing circuit 224 of the display device 10 or a monitoring apparatus of the inspection apparatus 2).

Referring to FIGS. 1 to 13, the inspection apparatus 2 according to an embodiment may include a power source generator 22 (also referred to as a power generator or a power voltage generator) and a variable impedance circuit 24. In an embodiment, the inspection apparatus 2 may be an inspection jig having a printed circuit board shape.

The power source generator 22 may generate a pixel voltage to drive the display device 10. For example, the power source generator 22 may include a power source generating circuit for generating the second pixel voltage VSS (for example, a direct current (DC)-DC converter (also referred to as a DC-DC (VSS)) for generating the second pixel voltage VSS). In an embodiment, the power source generator 22 may further include a power source generating circuit for generating the first pixel voltage VDD. The power source generator 22 may output the second pixel voltage VSS through an output terminal OUT2.

The variable impedance circuit 24 may be electrically connected to the output terminal OUT2 of the power source generator 22. In an embodiment, the variable impedance circuit 24 may include a variable resistance circuit 24A and a variable capacitor circuit 24B.

The variable resistance circuit 24A may be electrically connected between the output terminal OUT2 of the power source generator 22 and an output terminal OUT3 of the variable impedance circuit 24 (for example, a second pixel voltage output terminal of the inspection apparatus 2).

The variable resistance circuit 24A may include resistors R1 to Rk electrically connected to the output terminal OUT2 of the power source generator 22 and connected in parallel to each other, first switches SW11 to SW1$k$ connected in parallel between the resistors R1 to Rk and the output terminal OUT3 of the variable impedance circuit 24, and a second switch SW2 electrically connected between the output terminal OUT2 of the power source generator 22 and the output terminal OUT3 of the variable impedance circuit 24.

In an embodiment, each of the first switches SW11 to SW1k may be connected in series to any one of the resistors R1 to Rk. The second switch SW2 may be connected in parallel with the resistors R1 to Rk and the first switches SW11 to SW1k. For example, the second switch SW2 may be directly connected to the output terminal OUT2 of the power source generator 22 and the output terminal OUT3 of the variable impedance circuit 24. In an embodiment, during an inspection to check the image quality of the display device 10, the impedance of the second pixel electrode CE may be lowered by turning off the first switches SW11 to SW1k and turning on the second switch SW2. Accordingly, deterioration of the image quality due to the variable impedance circuit 24 can be prevented.

By controlling the first switches SW11 to SW1k and the second switch SW2, a resistance value of the variable resistance circuit 24A may be variously changed.

The variable capacitor circuit 24B may include third switches SW31 to SW3j electrically connected to the output terminal OUT2 of the power source generator 22 and connected in parallel to each other, and capacitors C1 to Cj connected in parallel between the third switches SW31 to SW3j and the reference voltage source (for example, the ground voltage source GND). In an embodiment, each of the capacitors C1 to Cj may be connected in series to any one of the third switches SW31 to SW3j.

By controlling the third switches SW31 to SW3j, a capacitance value of the variable capacitor circuit 24B may be variously changed.

During the inspection of the display device 10, the second pixel voltage VSS may be supplied from the power source generator 22 of the inspection apparatus 2 to the second pixel electrode CE of the display device 10 via the variable impedance circuit 24. For example, the output terminal OUT3 of the variable impedance circuit 24 may be electrically connected to the second power source line PL2 (or a power source pad connected to the second power source line PL2) of the display device 10. Accordingly, the impedance value of the second pixel electrode CE may be adjusted by the variable impedance circuit 24 during the inspection of the display device 10.

In an embodiment, a defect related to the second pixel electrode CE of the display device 10 may be detected using the inspection apparatus 2 including the variable impedance circuit 24. For example, when a defect related to the second pixel electrode CE occurs in the display device 10 to be inspected, the impedance value of the second pixel electrode CE may be adjusted using the variable impedance circuit 24 so that the sensing signal S se' input to the sensing circuit 224 can be significantly changed by the noise signal Sno enough to detect the defect. For example, in each display device 10, the impedance value of the second pixel electrode CE may be adjusted using the variable impedance circuit 24 to be optimized to detect a desired type of defect in relation to the second pixel electrode CE. In this case, an impedance value of the variable impedance circuit 24 may be a value experimentally derived using a sample display device of the same model as the display device 10 before the display device 10 is inspected.

For example, with respect to a sample display device including a desired type of defect in relation to the second pixel electrode CE (for example, the display device 10 in which the stabilization capacitor Cs is separated as shown in FIG. 10, the display device 10 including the panel unit 100 in which the thickness of the second pixel electrode CE is defective as shown in FIG. 11, or the display device 10 including the panel unit 100 in which a film formation defect of the second pixel electrode CE occurs as shown in FIG. 12), an output signal of the ADC 224B (or a monitoring device provided in the inspection apparatus 2 and connected to the touch sensor 120) may be monitored while changing the impedance value of the second pixel electrode CE using the variable impedance circuit 24. In this case, when a capacitance value output from the ADC 224B of the sample display device differs from a capacitance value output from the ADC 224B of a normal display device by more than a reference value under the same impedance condition, the resistance value and the capacitance value of the variable impedance circuit 24 may be classified as values capable of detecting defects with respect to the display device 10 of a corresponding model.

For example, when the capacitance value shown by the solid line in FIG. 14 is a capacitance value obtained by amplifying and digitally converting the sensing signal S se' output from the touch sensor 120 of a normal sample display device with respect to a first set value of the variable impedance circuit 24 (for example, values obtained by amplifying and digitally converting the sensing signals Sse' output from the reception channels Rx_CH connected to the second sensor electrodes ET2, and may be different depending on positions of the second sensor electrodes ET2), and when the capacitance value shown by the dotted line in FIG. 14 is a capacitance value obtained by amplifying and digitally converting the sensing signal Sse' output from the touch sensor 120 of a sample display device including a first type of defect in relation to the second pixel electrode CE with respect to the first set value of the variable impedance circuit 24, when capacitance values detected from the normal sample display device and the sample display device including the first type of defect show a difference greater than or equal to the reference value, the first set value of the variable impedance circuit 24 may be defined as a value capable of detecting the display device 10 including the first type of defect. In this way, while variously changing the resistance value and the capacitance value of the variable impedance circuit 24, a set value of the variable impedance circuit 24 suitable for detecting a desired type of defect in the display device 10 of each model can be extracted, and the extracted set value may be stored in the form of a lookup table according to the resistance value and the capacitance value of the variable impedance circuit 24. For example, as shown in Table 1 below, while changing the resistance value and the capacitance value of the variable impedance circuit 24 with respect to the sample display device of each model, a lookup table LUT having the form shown in Table 1 below can be generated.

TABLE 1

| LUT | CV1 | CV2 | ... | CVq |
|-----|-----|-----|-----|-----|
| RV1 | O | O | ... | O |
| RV2 | O | O | ... | O |
| ... | ... | ... | ... | ... |
| RVp | O | O | ... | X |

In Table 1, CV1 to CVq may represent capacitance values of the variable impedance circuit 24, and RV1 to RVp may represent resistance values of the variable impedance circuit 24. In addition, "O" may indicate a case in which a desired type of defect can be detected in relation to the second pixel electrode CE, and "X" may indicate a case in which a desired type of defect is difficult to detect in relation to the second pixel electrode CE.

When inspecting the display device 10 corresponding to each model, in a state in which the impedance value of the variable impedance circuit 24 is set with reference to the lookup table LUT corresponding to the model, the inspection apparatus 2 may supply the second pixel voltage VSS to the second pixel electrode CE. In addition, the touch sensor 120 may be driven, and the capacitance value detected by the touch driver 220 (or the monitoring device of the inspection apparatus 2) may be compared with reference data (for example, data corresponding to the capacitance value corresponding to the normal or defective case of FIG. 14) stored in advance with respect to the sample display device to detect the defect related to the second pixel electrode CE of the display device 10.

In an embodiment, when it is difficult to directly check the capacitance value detected by the sensing circuit 224 of the display module 1 including each display device 10 or each sample display device, the monitoring device capable of directly detecting and/or converting and monitoring the sensing signals (for example, the sensing signals S se' including the sensing signal Sse by the mutual capacitance Cm and the noise signal Sno added to the sensing signal Sse) output from the second sensor electrodes ET2 may be provided or formed in the inspection apparatus 2.

Figure 15:
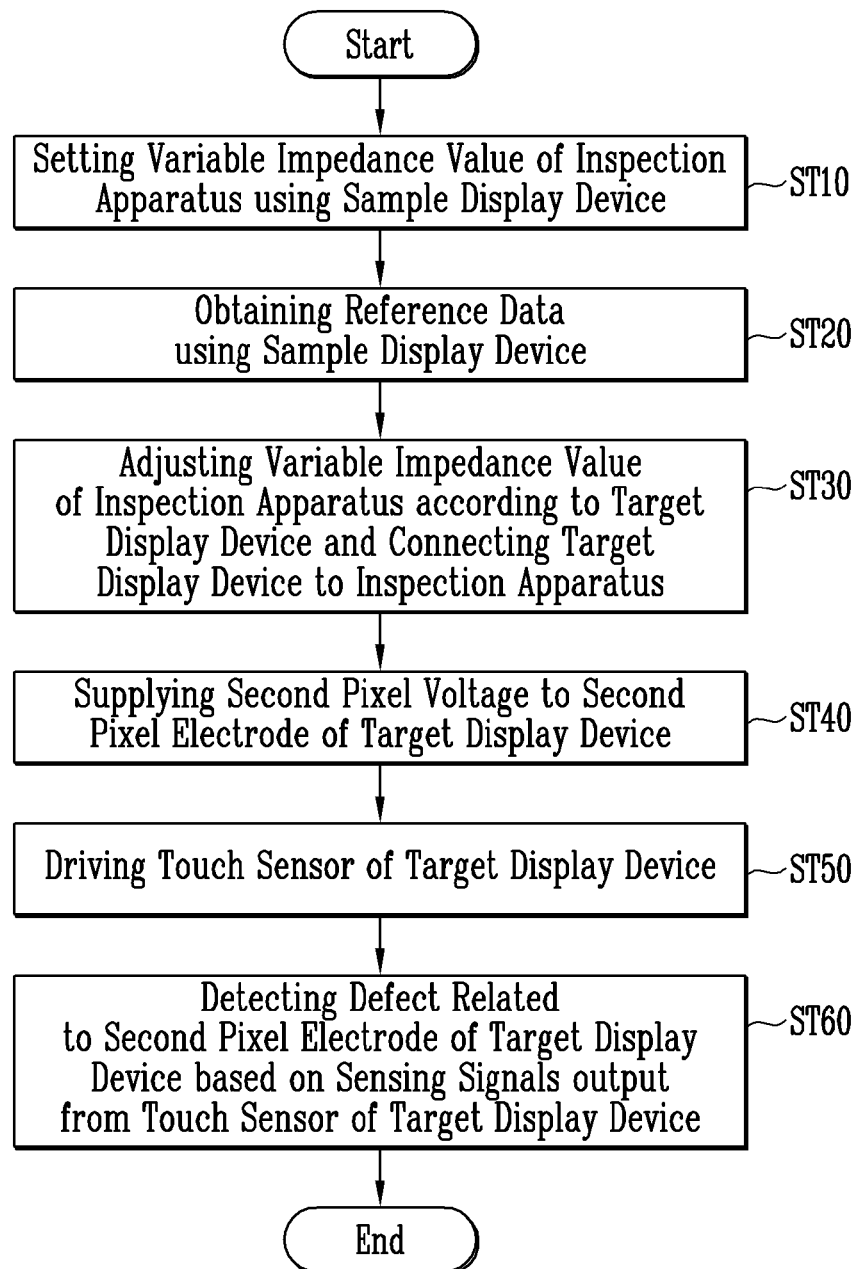
FIG. 15 is a flowchart illustrating a method of inspecting a display device according to an embodiment.
Figure 16:
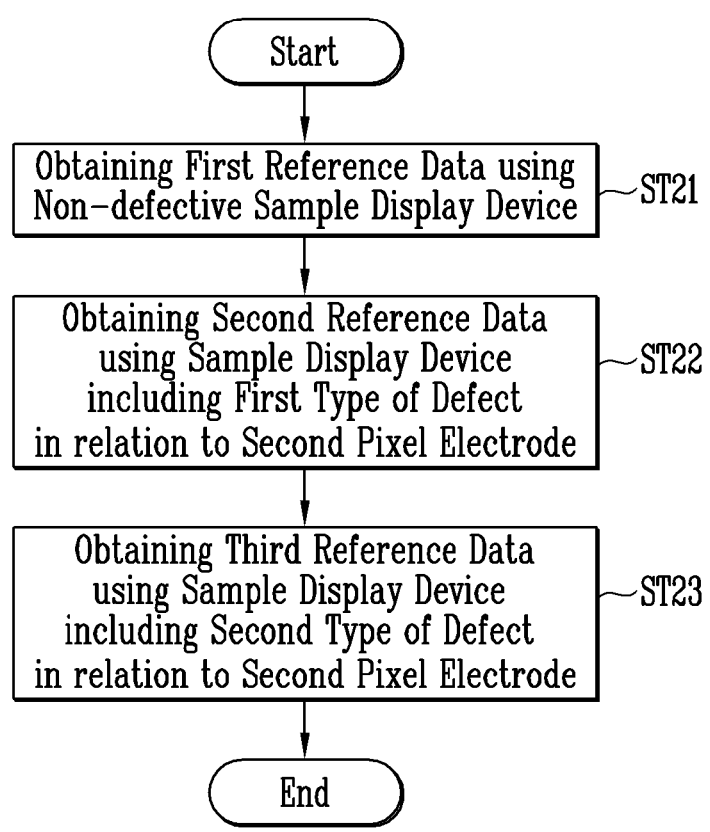
FIG. 16 is a flowchart illustrating a method of generating reference data according to an embodiment.

FIG. 15 is a flowchart illustrating a method of inspecting a display device 10 according to an embodiment. FIG. 16 is a flowchart illustrating a method of generating reference data according to an embodiment. The reference data may be used to determine a defect of the display device 10 (also referred to as a target display device) when inspecting the defect of the display device 10.

Referring to FIGS. 1 to 16, before inspecting a defect of the second pixel electrode CE with respect to the target display device 10, a variable impedance value of the inspection apparatus 2 for the model may be set using a sample display device of the same model as the target display device 10. For example, the sample display device may be connected to the inspection apparatus 2, and an impedance value capable of detecting a desired type of defect in relation to the second pixel electrode CE (for example, an impedance value optimized for a corresponding model) may be derived while changing the impedance value of the variable impedance circuit 24. The impedance value may be set as the variable impedance value (the impedance value of the variable impedance circuit 24) of the inspection apparatus 2 for the corresponding model (or an inspection for detecting a specific type of defect in the corresponding model). (ST10)

In a state in which the impedance value of the variable impedance circuit 24 is adjusted to the set variable impedance value, the reference data that can be used to inspect a defect of the target display device 10 may be obtained using the sample display device. For example, the impedance value of the variable impedance circuit 24 may be adjusted to the set variable impedance value, and the variable impedance circuit 24 of the inspection apparatus 2 may be electrically connected to the second pixel electrode CE of the sample display device to supply the second pixel voltage VSS to the second pixel electrode CE. In addition, the reference data may be obtained based on sensing signals output from the touch sensor 120 of the sample display device. (ST20)

In an embodiment, first reference data corresponding to a non-defective display device 10 may be obtained using at least one sample display device. Also, reference data corresponding to the display device 10 including a specific type of defect in relation to the second pixel electrode CE may be further obtained using the sample display device. For example, the first reference data may be obtained based on the sensing signals output from the touch sensor 120 of a non-defective sample display device. (ST21) In addition, second reference data may be obtained based on sensing signals output from the touch sensor 120 of the sample display device including a first type of defect in relation to the second pixel electrode CE (for example, a connection defect between the second pixel electrode CE and the stabilization capacitor Cs, such as separation of the stabilization capacitor Cs, etc.). (ST22) In an embodiment, the second reference data may be obtained based on the sensing signals output from the touch sensor 120 of the sample display device including a second type of defect in relation to the second pixel electrode CE (for example, a film formation defect of the second pixel electrode CE). (ST23) When only one type of defect is detected in relation to the second pixel electrode CE, a step of obtaining the second or third reference data may be omitted.

Thereafter, the variable impedance value of the inspection apparatus 2 may be adjusted according to the target display device (for example, according to the model of the target display device), and the target display device may be connected to the inspection apparatus 2. (ST30)

Thereafter, the power source generator 22 of the inspection apparatus 2 may be driven, and the second pixel voltage VSS may be supplied to the second pixel electrode CE of the target display device 10 through an output terminal connected to the variable impedance circuit 24 (for example, the output terminal OUT3 of the variable impedance circuit 24). (ST40)

In a state in which the second pixel electrode CE of the target display device 10 is electrically connected to the variable impedance circuit 24, the touch sensor 120 of the target display device 10 may be driven. (ST50)

Thereafter, based on the sensing signals output from the touch sensor 120 of the target display device 10 (for example, capacitance code values converted into digital values), a defect related to the second pixel electrode CE of the target display device 10 may be detected. For example, it may be determined whether there is a defect related to the second pixel electrode CE by comparing the sensing signals output from the touch sensor 120 of the target display device 10 with the first reference data. In addition, the type of defect related to the second pixel electrode CE of the target display device 10 may be determined by comparing the sensing signals output from the touch sensor 120 of the target display device 10 with the second reference data and/or the third reference data. (ST60)

As described above, according to various embodiments, the impedance value of the variable impedance circuit 24 of the inspection apparatus 2 connected to the second pixel electrode CE of the target display device 10 may be adjusted according to the model of the target display device 10 to be inspected, and the defect related to the second pixel electrode CE of the target display device 10 may be easily or readily detected based on the sensing signals output from the touch sensor 120 of the target display device 10. In a case that the variable impedance value by the combination of the resistors R1 to Rk and the capacitors Cl to Cj provided in the variable impedance circuit 24 of the inspection apparatus 2 is subdivided, the impedance value of the second pixel electrode CE may be easily or readily adjusted for various models of target display devices 10. Accordingly, usability of the inspection apparatus 2 may be increased.

According to various embodiments, one or more defects related to a pixel electrode of a display device may be detected using a variable impedance circuit provided in an inspection device and a touch sensor of the display device. The effects according to various embodiments, however, are not limited by the contents described above, and various additional or alternative effects are contemplated.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An apparatus for inspecting a display device including a touch sensor, the apparatus comprising:
   a power source generator configured to generate a pixel voltage of the display device; and
   a variable impedance circuit electrically connected to an output terminal of the power source generator,
   wherein the variable impedance circuit comprises:
   a variable resistance circuit electrically connected to the power source generator and an output terminal of the variable impedance circuit, and comprising resistors connected in parallel with each other; and
   a variable capacitor circuit electrically connected to the power source generator and a ground voltage source.

2. The apparatus of claim 1, wherein the variable resistance circuit further comprises:
   first switches electrically connected in parallel between the resistors and the output terminal of the variable impedance circuit, each of the first switches being electrically connected in series to any one of the resistors; and
   a second switch electrically connected between the output terminal of the power source generator and the output terminal of the variable impedance circuit, the second switch being electrically connected in parallel with the resistors and the first switches.

3. The apparatus of claim 2, wherein the second switch is directly connected to the output terminal of the power source generator and the output terminal of the variable impedance circuit.

4. The apparatus of claim 1, wherein the variable capacitor circuit comprises:
   third switches electrically connected to the output terminal of the power source generator and electrically connected in parallel to each other; and
   capacitors electrically connected in parallel between the third switches and the ground voltage source, each of the capacitors being electrically connected in series to any one of the third switches.

5. The apparatus of claim 1, wherein the power source generator is configured to supply the pixel voltage to a pixel electrode of the display device via the variable impedance circuit.

6. The apparatus of claim 5, wherein the pixel voltage is a low-potential pixel voltage.

* * * * *